3 Sheets--Sheet 1.
A. M. ASAY & J. W. WOOD.
Corn-Planters and Fertilizer-Distributors.
No. 151,192. Patented May 26, 1874.
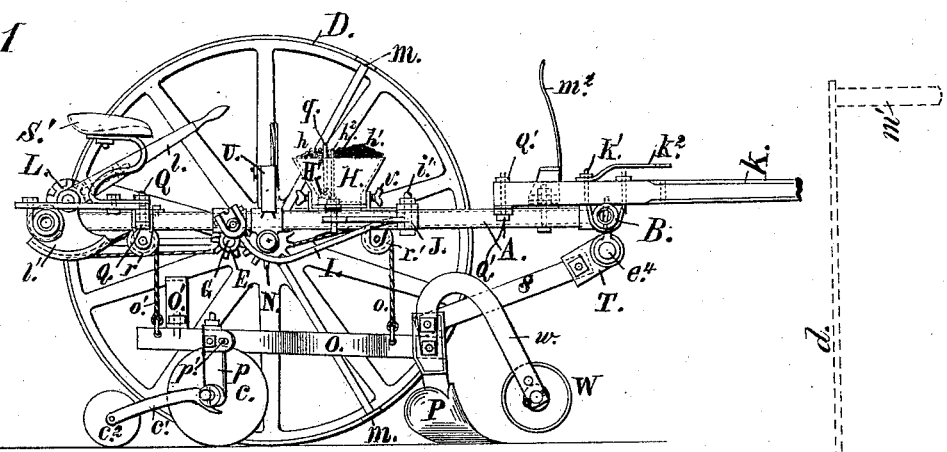
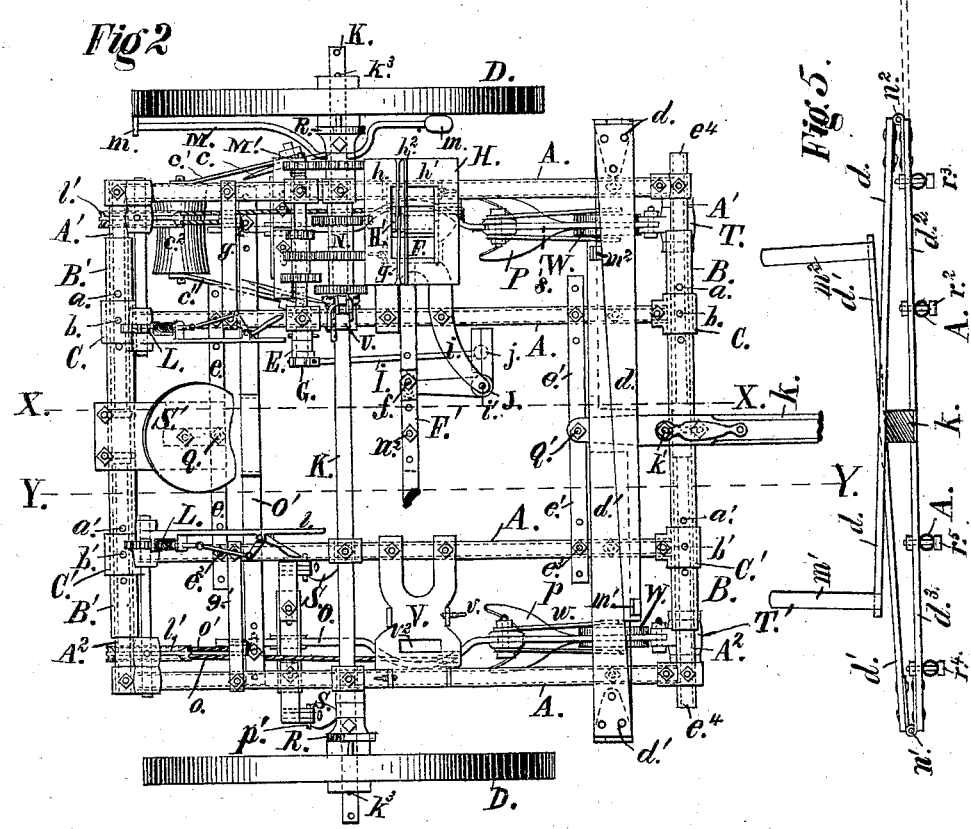
Witnesses:
Inventor 3 Sheets--Sheet 2.
A. M. ASAY & J. W. WOOD.
Corn-Planters and Fertilizer-Distributors.
No. 151,192. Patented May 26, 1874.
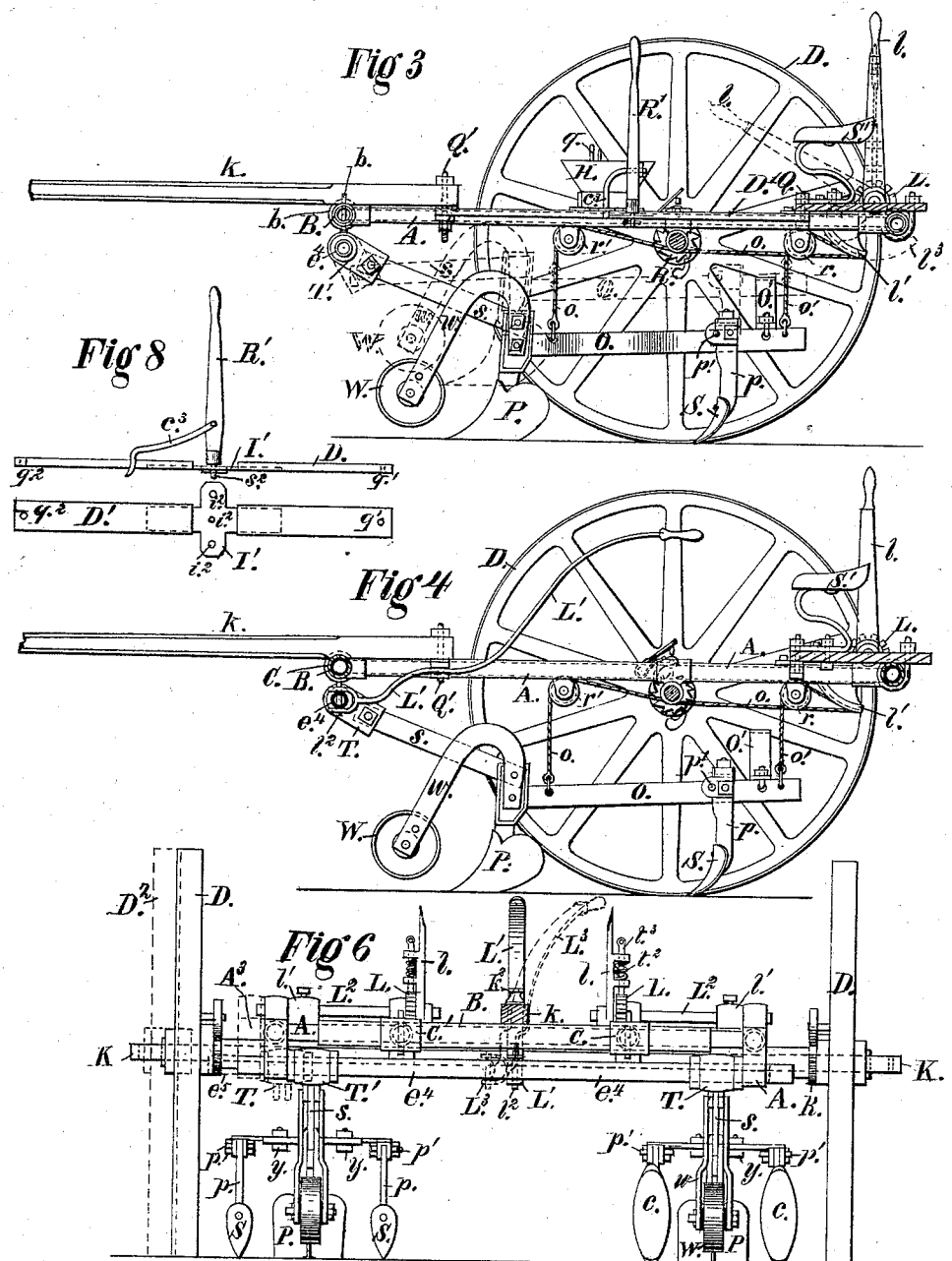
Witnesses:
A. M. Sallude Jr.
L. Lesieur Jr.
Inventor
A. Merritt Asay
John W. Wood by
A. M. Stout atty

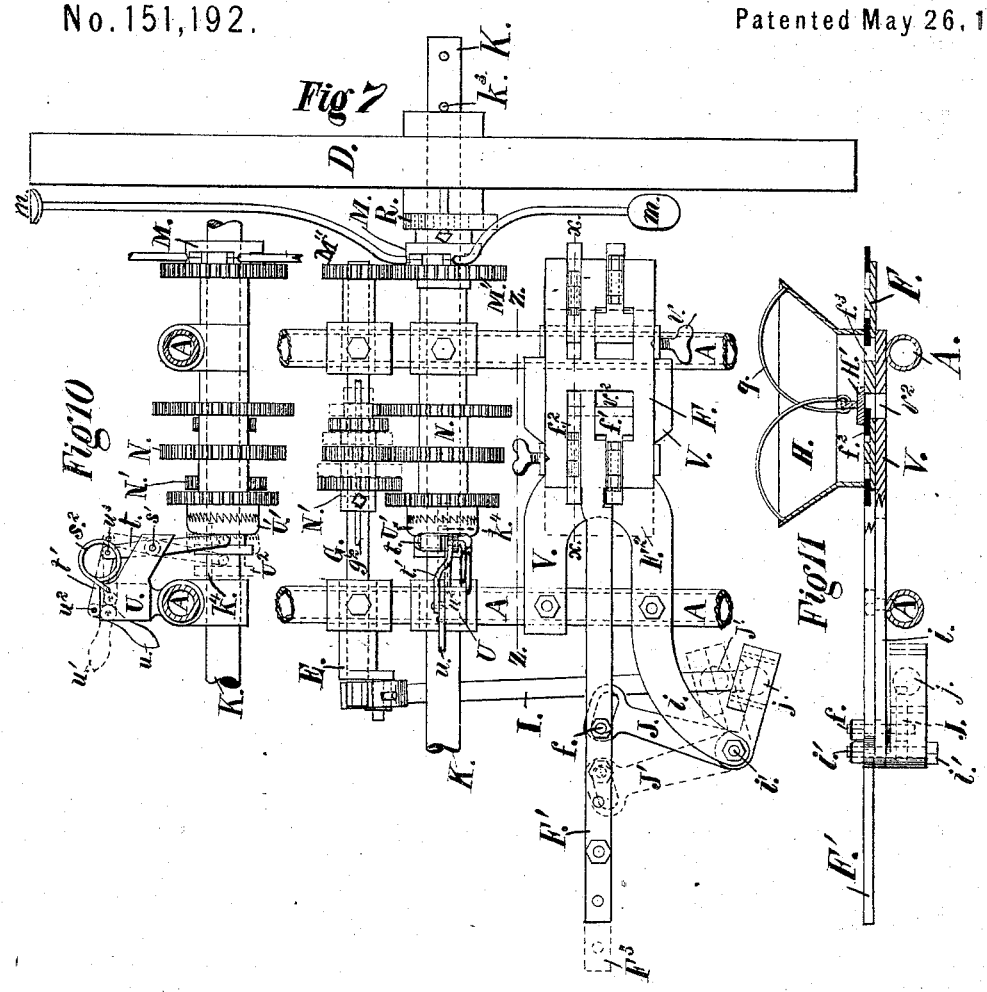

UNITED STATES PATENT OFFICE

A. MERRITT ASAY AND JOHN W. WOOD, OF PHILADELPHIA, PA.

IMPROVEMENT IN CORN-PLANTERS AND FERTILIZER-DISTRIBUTERS.

Specification forming part of Letters Patent No. 151,192, dated May 26, 1874; application filed December 30, 1873.

*To all whom it may concern:*

Be it known that we, A. M. ASAY and JOHN W. WOOD, of Philadelphia, county of Philadelphia and State of Pennsylvania, have invented a Corn-Planter, of which the following is a specification:

Our invention relates to such a construction and arrangement of the parts of which such a machine is composed that the force exerted by the team in drawing it over the ground will automatically open two furrows, drop therein both the corn and the phosphate or other fertilizer at the same time, with measured quantities in each hill, and will drop them at measured distances apart, cover them with soil and roll it into a level surface over them, and will mark a line parallel to the furrows made, as a guide for the driver in planting the two succeeding rows; and will also make a line of hill-marks on the ground a little to the left of each left-hand furrow, each mark opposite to a hill planted, as a further guide to accurate planting, to the end that the growing plants may be afterward cultivated both ways.

In the accompanying drawings, Figure 1 represents a central vertical longitudinal section of the left half of our machine, made as indicated by the broken line X X in Fig. 2, which is a plan or top view of the same; and Fig. 3 is a like view of the right-hand half of the same; Fig. 4, a like view of the same section, except that the hopper H and lever R' are omitted; Fig. 5, a detail view of the return-markers; Fig. 6, a front view of the machine; Fig. 7, a plan view of the left-hand wheel, a portion of the axle-tree, the whole of the counter-shaft, and the devices connected with the two; Fig. 8, a side and edge view of the devices for operating the sliding dropper by hand; Fig. 9, a plan view in detail of one of the furrow-opening plows, and a roller to regulate the depth of its furrow in front, and a wrought-iron bar connecting them, with the covering and locking devices, to the rear of the axle-tree. Fig. 10 is a front view of so much of the axle-tree as carries the drive-wheels, a clutch, and devices for operating it; and Fig. 11 is a side view of a vertical section in detail, made as indicated by the broken line $x$ $x$ in Fig. 7, of the base-plate, dropping-bar, and hopper.

The main frame is made of metal in the form of tubes, in order to secure at the same time both strength and lightness, and is placed upon the axle-tree K of the same material. The four longitudinal tubes are made to slide laterally upon the front and rear cross-pieces, and upon the axle-tree, so that the frame may be increased or diminished in width as required. The front and rear cross-pieces are each in two parts, $A^1$ and $A^2$, and their inner ends inclosed in larger tubes B and B', as shown in Fig. 2, and by means of holes and pin $b$ and $b'$ through both parts of each cross-piece, and these larger tubes, the frame may be adjusted and fastened so that the planting apparatus will plant in rows at three different distances apart. The two inner longitudinal tubes are connected with the larger tubes by the tie-joints C, as shown. Upon the axle-tree K, and upon the inner side of each of the carrying-wheels D D, is fastened a ratchet-wheel, R, which is operated by two or more pawls pivoted on the wheel, and held to their work by suitable springs. These pawls are so arranged, with reference to the teeth of the ratchet-wheel, that some one of them may be always engaged, or very nearly so, with a tooth of the ratchet-wheel, so that there may be no loss of motion at the time of the carriage beginning to move. By means of the pawls and ratchet-wheel, when the carrying-wheels roll forward they revolve the axle-tree, and it, by means of the drive-wheels N upon it, sets all the operative parts in motion. This nest of wheels N turns and slides freely upon the axle-tree. The outer end of its hub abuts against a collar, which holds it at a suitable distance from the side of the frame, and the outer face of the innermost wheel of the nest is provided with teeth, which mesh with those of a clutch-nut, U', which slides laterally upon the axle-tree, but is kept from turning thereon by a feather in key-seat $K^4$. The clutch-nut is thrown in and out of gear with the face of the wheel and held in either position by the devices shown in Fig. 10, which consist of the standard U, and the yoke $t$, pivoted thereto at $S^1$, the handle-lever $u$, pivoted to the standard also, and connected with the upper end of the yoke by a link and the coiled spring $S^2$. From the nest of drive-wheels N rotary motion is imparted to the counter-shaft G by means of the nest of three gear-wheels, $N'$, cast upon one hub, and fastened upon said shaft by a set-screw extending through its hub into it, and is prevented from turning thereon by a suitable feather and groove. These gear-wheels are of three different sizes, and increase in size from the left to the right, while the drive-wheels N are likewise of as many sizes, but increase in size from the right to the left. By setting this nest of gear-wheels at different points upon the counter-shaft G, so as to be able to throw one or another of its wheels in gear with one or another of the drive-wheels, the speed of the reciprocating dropping-bar is increased or diminished as required, as well, also, as the rotary motion of the hill-marker, which consists of three radial arms equidistant apart, and extending out even with the periphery of the carrying-wheel and the gear-wheel $M'$ on the axletree, and which serves as a hub for the said arms, which have hand-plates $m$ $m$ $m$ on their outer ends. This gear-wheel $M'$ meshes with a similar but smaller wheel, $M''$, mounted upon the counter-shaft. Now, as the counter-shaft communicates motion to both the hill-marker and the dropping apparatus, any change in its speed of motion will change theirs, respectively, in a corresponding degree. Its motion is transmitted to the dropping apparatus through crank E on the inner end of the counter-shaft G, the connecting-rod I, which is connected by the ball-and-socket joint $j$ with the bell-crank lever J, which is bolted to and supported by the arm $i$ of the bed-plate V, and the hinder end of the bell-crank lever J is provided with a long transverse slot through it, and a bolt, $f$, in one of the bars $F'$, connecting the two dropping-slides F F, passes down through that slot, and thus the transmission of motion is effected. (See Fig. 7.) The dropping-slides F F have each two pairs of apertures through their respective outer ends, one of which is for the corn, and the other for the fertilizer, to pass through from the hopper above down to the ground, through the single large aperture in the bed-plate V. Each aperture in the dropping-slides is provided with a small slide, like those shown at $f^1$ and $f^2$ in Fig. 7, upon its upper face, by means of which such apertures may be opened or closed to drop more or less of the corn or fertilizer at a dropping, as may be desired. The dropping-slides for the respective hoppers (one on each side of the machine) are connected by wrought-iron bars $F'$ and $F'$, which are provided with each a series of holes, by means of which they can be pinned at three distances apart, and, when so connected, they operate as a single bar, which is caused to reciprocate by the devices before described.

The hopper H is double, having one apartment for the corn and the other for the fertilizer, and is held just above the sliding dropper by a series of posts extending up on each side of it from the bed-plate V, and adjustably fastened between the rows of posts by set-screws like the one marked $v$ in Fig. 1.

Every revolution of the crank E forces the compound sliding bar F F $F'$ $F'$ forth and back once, and in doing so two droppings of the corn and fertilizer are effected. In order to assist in the separation of about the required number of grains of corn for a hill from the mass in the corn-hopper, the sliding block $H'$ is held down against the bottom thereof by the spring $q$, but which allows the block to yield rather than crush the grains.

The use of the marks made by the hill-marker is to indicate to the operator how to locate the beginning hills at the time of starting across the field. The return-markers $d$ and $d'$, having the steel straps $m^1$ and $m^2$ attached to their outer ends, are each hinged, so that they will fold up over and across the frame, as shown in Figs. 2 and 5, and be out of the way when not in use. Their inner ends are bolted across the frame and provided with holes, so that their attachments to the frame may be changed to suit any changes made in the width of the same.

The furrow-opening plow P has both a right and left mold-board, so that the furrow opened by it is left in a V form, which secures, as nearly as may be, a correct alignment of the plantings of corn, the depth of the furrow being regulated by the roller W, the bearing of which is made adjustable in height. The standards $p$, to which the plow P and the twin bars $w$, between which the roller W has its bearings, are connected by a pivot-joint to the swinging bar O, which is curved outwardly, in order to be out of the way of the dropping-spout and the inclined bar S, which latter bar is jointed upon the deflecting-rod $e^4$, which is placed under the front tubes of the frame. Upon the rear end of the rod O is attached a frame to support the axles of a pair of disk-wheels, $c$ $c$, and the bars $c^1$ $c^1$, on the outer ends of which the leveling-roller $c^2$ has its axle. The axles of the disk-wheels are set at an angle to each other, so that the disks are much wider apart in the front than in the rear; and, therefore, when they revolve (one on each side of the furrow) in the forward movement, they throw the soil into the same, and cover the corn and fertilizer, and are followed by the roller, which levels and slightly packs the surface.

By means of the slots $y$ $y$ and their bolts, the distance between the disk-wheels can be regulated according to the character of the soil, whether heavy or light. The standards $p$, to which the disks and cultivator-teeth are fastened, are joined to the frames supporting them by two bolts, one of which may be of wood, so that it will be broken in case of obstruction, and then the teeth or disks will swing back upon the other instead of being broken. The chains o o pass over the pulleys r and r to the rear of the frame, where they are attached to the grooved sector l', and being attached also to the bars O O, the frames under the main frame and carrying the plows P P and disks c c or the cultivator-teeth, and by means of it and the lever l and the ratchet L, these frames can be raised up so as to clear the ground, and so held during the operation of turning the machine, or transferring it from one field or place to another.

Now, when it is desired to operate the dropping-slides by hand, the ground should first be laid off one way with any common plow, and the forward end of the bar D' is fastened under the tongue, and the rear end fastened with the front seat-bolt, and then by inserting the foot of the lever R' into any of the holes $c^2$ therein, and the said lever being provided with the hook $c^3$, and that hook being inserted in any of the series of holes in the slide-bars F' F', the sliding droppers F F may be reciprocated by hand.

This device is also adjustable to the different widths of planting as the automatic apparatus is, and when it is desired to use the machine as a cultivator, then the leveling-roller $c^2$ and the disks c c with their standards are removed, and standards p p, with cultivator-teeth fastened upon them, are inserted and bolted in the places before occupied by the standards of the disk-wheels, the opening-plows remaining in their places without change; and, therefore, each of such plows will have a cultivator-tooth on each side of it, and the main frame will be so adjusted in width that a central clear space of sufficient width will be left between the right and left gangs for the row of corn-plants, and so the machine will operate as a straddle-row cultivator; and, by the use of the lever L pivoted to the tongue k, and provided with a yoke on its forward end to fit around the deflecting-rod $e^4$, the cultivator-teeth and plows can be moved to the right and left by the driver when necessary to avoid obstructions in or upon the ground, or to avoid the pulling up of any plants that may be out of line without altering the course of the team.

What we claim as our invention is—

1. The frame of the machine, consisting of the four longitudinal tubes A A A A, the two short tubes $A^1$ and $A^2$, and the larger tube B inclosing them, constituting an adjustable cross-piece at each end of the frame, the whole frame being adjustable to three different widths by means of holes and pins, substantially as and for the purpose described and set forth.

2. The combination of the nest of drive-wheels N on the axle-tree K, the nest of gear-wheels N' on the counter-shaft G, each, respectively, cast upon one hub, the gear-wheel M'', also on the counter-shaft, and the wheel M' upon the axle-tree, provided with three radial arms having hand-plates m m m on their outer extremities, all constructed and arranged substantially as shown and described, for the purpose set forth.

3. The combination of the standard U, mounted upon the main frame, yoke t, pivoted thereto at $S^1$, handle u, and link shown, and spring $S^2$, as co-operating devices to operate the clutch U', each constructed and all arranged substantially as shown and described, 4. The combination of the counter-shaft G, crank E, connecting-rod I, slotted bell-crank lever J, arm i, bed-plate V, bolt f, and bar F', as co-operating devices to communicate motion to the sliding droppers F F, substantially as shown and described.

5. The clearing devices for the feed-slide F, consisting of the block H', mounted upon the spring q, the extremities of which are attached to the upper edges of the corn-hopper, and the body of which is bent, as shown, substantially as described, for the purpose set forth.

6. The combination of the disk-wheels c c, adjustably mounted and arranged in their frames, as shown and described, the pivoted bar O, and the furrow-opening plow P, mounted just in advance of where the corn and fertilizer are dropped, as co-operating devices for placing the plantings properly under the surface, substantially as set forth.

7. The swinging frame, consisting of the horizontal bar O and the inclined bar S, connected by a hinge-joint to the deflecting-rod $e^4$, and supported in the rear by the chain o, which is fastened to grooved sector l', all constructed and arranged substantially as shown and described, for the purpose set forth.

A. MERRITT ASAY.
      JNO. W. WOOD.

Witnesses:
 P. O'DONNELL,
 A. M. STOUT.